Patented Oct. 22, 1946

2,409,755

UNITED STATES PATENT OFFICE 2,409,755

METHOD FOR OBTAINING 5,5-DIARYL-HYDANTOINS

Henry R. Henze, Austin, Tex., assignor to Parke, Davis & Company, Detroit, Mich., a corporation of Michigan No Drawing. Original application September 9, 1940, Serial No. 356,107. Divided and this application May 11, 1944, Serial No. 535,211

10 Claims. (Cl. 260—309.5)

This invention relates to a method for obtaining hydantoins from ketones and more particularly to the preparation of 5,5-diarylhydantoins from diaryl ketones.

This application is a division of my copending application Serial No. 356,107, filed September 9, 1940.

An object of this invention is the preparation of diarylhydantoins from diaryl ketones according to a new and novel method.

Other objects of this invention will be apparent on perusal of the specification and the appended claims.

Hitherto diarylhydantoins have been prepared from derivatives of benzil and similar compounds. However, no method has been available for the preparation of 5,5-diarylhydantoins from the corresponding diaryl ketones, despite the fact that such ketones are frequently more readily available than the corresponding benzil derivatives.

I have found that 5,5-diarylhydantoins can be prepared from diaryl ketones by heating the latter in fused acetamide or other lower aliphatic amide as a solvent, with a water-soluble cyanide and ammonium carbonate or an equivalent substance capable of yielding ammonia and carbon dioxide under the conditions of reaction. The reaction mixture thus obtained is treated so as to remove any unreacted diaryl ketone and then the hydantoin is isolated, for example, by acidifying the alkaline solution.

The reaction may be illustrated as follows for the case of the preparation of 5,5-diphenylhydantoin:

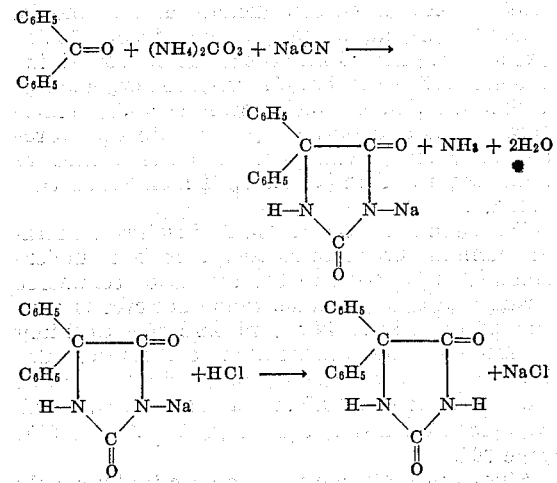

I have also found that the conditions of reaction required for the formation of diarylhydantoins from diaryl ketones determine the yield which may be obtained. In general, the operating temperature should be maintained within the range of 50–150° C. and the time required for reaction proportionately varied from at least 20 hours for the lower temperatures to at least 1 hour for the higher temperatures, although longer times of heating are in general helpful. At the lower temperatures longer times of heating are required to obtain the same gross yield that may be obtained at higher temperatures with shorter reaction times. For example, while at least 20 hours of heating at 55° is necessary to get a substantial yield, the same yield can be obtained at 110° by only a few hours of heating in a closed vessel so as to retain the volatile components.

In general, the diaryl ketone is not completely converted into the diarylhydantoin. The yield of diarylhydantoin calculated on the basis of the amount of diaryl ketone originally introduced into the reaction mixture is termed the gross yield while the yield of diarylhydantoin calculated on the basis of the amount of diaryl ketone actually used up, i. e. the difference between the amount of diaryl ketone originally introduced and the amount recovered, is termed the net yield. While the gross yield is considerably diminished by operating at lower temperatures and for shorter times of heating, the net yield is good under all conditions within the range indicated.

*Example 1.—Preparation of 5-phenyl-5-(p-bromophenyl-(-hydantoin*

26 g. of p-bromobenzophenone is dissolved in 125 g. of fused acetamide and then 28 g. of ammonium carbonate and 9 g. of potassium cyanide are added. The mixture is heated in a steel container at 110° C. for 6 hours. While still liquid, the contents of the bomb are diluted with water and acidified with a slight excess of mineral acid, such as sulfuric or hydrochloric acid. The mixture is then chilled and the precipitated crude 5-phenyl-5-(p-bromophenyl-)5-hydantoin is filtered off. It is then treated with an aqueous solution of dilute sodium hydroxide to dissolve the hydantoin from the solid unreacted p-bromo benzophenone. After filtration, the alkaline extract is then acidified to cause the separation of solid pure 5-phenyl-5-(p-bromophenyl-)-hydantoin which is filtered off and dried. The melting point is 239° C. and the yield is 28 g. (85.2% net yield.)

Instead of working up the reaction mixture as described above, the reaction mixture may be rendered somewhat more alkaline and then any unreacted benzophenone removed by extraction with a water-immiscible organic solvent such as benzene, ether, or the like. Then the alkaline layer may be acidified to precipitate the diarylhydantoin which may be purified by recrystallization as for example from alcohol.

Example 2.—Preparation of 5-phenyl-5-(p-chlorophenyl-)-hydantoin

A mixture of 21.6 g. of p-chloro-benzophenone, 125 g. acetamide, 28 g. of ammonium carbonate and 9 g. of potassium cyanide is heated in a bomb for 4 hours at 110° C. While still hot, the reaction mixture is diluted with water and then cooled. The solution is acidified, the precipitated crude 5-phenyl-5-(p-chloro-phenyl-)-hydantoin is collected and purified as in Example 1. The yield of this product, melting point 243° C. is 27 g.

Example 3.—Preparation of 5,5-di-(p-dimethylaminophenyl-)-hydantoin

To 115 g. of fused acetamide is added 18 g. of Michler's ketone (bis-p,p'-(dimethylamino)-benzophenone) 6.5 g. of potassium cyanide and 21 g. of ammonium carbonate. The mixture is heated at 140° C. for 14 hours. Then 150 cc. of water is added and the solution extracted with benzene. The alkaline layer is carefully neutralized with acetic acid and the precipitated 5,5-di-(p-dimethylaminophenyl-)-hydantoin collected and dried. The yield of product melting point 276–280° C. is 6 g.

Example 4.—Preparation of 5-(diphenylene-)-hydantoin 18 grams of fluorenone is dissolved in 100 grams of fused acetamide. Then 9 grams of potassium cyanide and 28.8 grams of ammonium carbonate are added and the mixture heated in a steel bomb at 110° C. for 10 hours. The reaction mixture is diluted with 150 cc. of water, and then the mixture is acidified with hydrochloric acid and the precipitated solid collected. The yield of diphenylene-hydantoin of melting point 324° C. is 21.5 grams (86% gross yield).

Example 5.—Preparation of 5,5-diphenylhydantoin using acetamide as a solvent 100 grams of acetamide is melted in a steel bomb and to it is added 9.1 grams of benzophenone, 2.45 grams of sodium cyanide and 4.8 grams of ammonium carbonate. The bomb is closed and heated at 110° C. for 4 hours. Then, while still liquid, the contents of the bomb are dissolved in water and acidified. The precipitate is collected and leached with 5% sodium hydroxide solution to dissolve the diphenylhydantoin. The undissolved benzophenone is separated and the alkaline solution is acidified with acetic acid to precipitate the 5,5-diphenylhydantoin. The precipitate is collected, dried and recrystallized from methanol. Thus there is obtained an 83.5% gross yield of the hydantoin; since 1.2 grams of benzophenone is recovered, the net yield is 96%.

The following table summarizes the results of a number of experiments in which the conditions of reaction and the solvents are varied.

| Expt. No. | Reactants | Solvent | Conditions | Gross yield | Net yield |
|---|---|---|---|---|---|
| | | | | Per cent | |
| 1 | 9.1 g. benzophenone, 4.5 g. potassium cyanide, 15.0 g. ammonium carbonate. | 100 cc. water | 100° C.; 14 hr | 0 | |
| 2 | ----do---- | 115 g. acetamide 20 cc. water | ----do---- | 91 | |
| 3 | ----do---- | ----do---- | 110° C.; 4 hrs | 33 | 93.5 |
| 4 | ----do---- | 115 g. acetamide | ----do---- | 95 | |
| 5 | ----do---- | 100 g. acetamide | 110° C.; 2 hrs | 44 | 95 |
| 6 | 9.1 g. benzophenone, 2.45 g. sodium cyanide, 4.8 g. ammonium carbonate. | ----do---- | 110° C | 83.5 | 96 |
| 7 | 9.1 g. benzopheno, 3.4 g. potassium cyanide, 4.8 g. ammonium carbonate. | ----do---- | ----do---- | 85 | |
| 8 | ----do---- | 50 g. acetamide | 110° C.; 6 hrs | 85 | |
| 9 | ----do---- | ----do---- | 110° C.; 4 hrs | 85 | |
| 10 | 18.2 g. benzophenone, 9.0 g. potassium cyanide, 28 g. ammonium carbonate. | 100 g. acetamide | 90° C.; 2 hrs | 5.1 | 79 |

Instead of using acetamide in this example, other lower aliphatic amides such as propionamide, butyramide and the like may also be employed.

In view of the foregoing examples it will be apparent that numerous variations can be employed in my process without departing from the spirit of my invention.

For example, I may employ any diaryl ketone containing in the aromatic nucleus no groups which are attacked by cyanides or ammonium carbonate or the combination of the two. Thus I may practice my invention on ring-halogenated diaryl ketones, on ring-amino substituted diaryl ketones, ring-alkylated diaryl ketones and the like. Such ketones include p-bromobenzophenone, p-aminobenzophenone, xenyl phenyl ketone, di-p-tolyl ketone, anisyl phenyl ketone, etc.

Instead of using sodium cyanide or potassium cyanide in the practice of my invention, I may employ other water-soluble cyanides such as calcium cyanide or lithium cyanide. However, I usually prefer to use alkali metal cyanides, because of their availability.

Instead of using ammonium carbonate in the practice of my invention, I may use other equivalent sources of carbon dioxide and ammonia. For example, ammonia gas and carbon dioxide gas may be pumped into the autoclave containing the mixture of the diaryl ketone, the organic solvent and the water-soluble cyanide, and the mixture heated and worked up to obtain the corresponding diarylhydantoin. Another source of ammonia and carbon dioxide is ammonium carbamate.

Where in the specification and claims the term ammonium carbonate is used, it is to be understood that it refers to the article of commerce designated by that name, which however is considered to be in reality a mixture of ammonium bicarbonate and ammonium carbamate. See further F. Ephraim Inorganic Chemistry (third ed. translated by P. C. L. Thorne and A. M. Ward, Nordeman Publishing Company, New York, 1939), page 801.

Since the invention may be practiced not only with ammonium carbonate, as above defined, but also with other equivalent sources of carbon dioxide and ammonia in the presence of water, I have used as a generic expression the phrase "reagent derived from the system $NH_3$—$CO_2$—Aq capable of regenerating all of these components under the conditions of reaction."

What I claim as my invention is:

1. Process for the preparation of a diaryl hydantoin which comprises heating together at temperatures above 90° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of a lower aliphatic amide, acidifying the reaction mixture, and separating the diaryl hydantoin thus produced.

2. Process for the preparation of a diaryl hydantoin which comprises heating together in a closed system preventing loss of volatile reactants at temperatures above 90° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of a lower aliphatic amide, acidifying the reaction mixture, and separating the diaryl hydantoin thus produced.

3. Process for the preparation of a diaryl hydantoin which comprises heating together at temperatures above 90° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of fused acetamide, acidifying the reaction mixture, and separating the diaryl hydantoin thus produced.

4. Process for the preparation of a diaryl hydantoin which comprises heating together in a closed system preventing loss of volatile reactants at temperatures above 90° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of fused acetamide, acidifying the reaction mixture, and separating the diaryl hydantoin thus produced.

5. Process for the preparation of 5,5-diphenyl hydantoin which comprises heating together at temperatures above 90° C. and for a time, at least a few hours, permitting accumulation of appreciable reaction product, benzophenone, a water-soluble inorganic cyanide, and a reagent derived from the system $NH_3$—$CO_2$—Aq capable of regenerating all of these latter components under the conditions of the reaction, in the presence of a lower aliphatic amide, acidifying the reaction mixture, and separating the 5,5-diphenyl hydantoin thus produced.

6. Process for the preparation of 5,5-diphenyl hydantoin which comprises heating together in a closed system preventing loss of volatile reactants at temperatures above 90° C. and for a time, at least a few hours, permitting accumulation of appreciable reaction product, benzophenone, a water-soluble inorganic cyanide, and a reagent derived from the system $NH_3$—$CO_2$—Aq capable of regenerating all of these latter components under the conditions of the reaction, in the presence of a lower aliphatic amide, acidifying the reaction mixture, and separating the 5,5-diphenyl hydantoin thus produced.

7. Process for the preparation of 5,5-diphenyl hydantoin which comprises heating together at temperatures above 90° C. and for a time, at least a few hours, permitting accumulation of appreciable reaction product, benzophenone, a water-soluble inorganic cyanide, and a reagent derived from the system $NH_3$—$CO_2$—Aq capable of regenerating all of these latter components under the conditions of the reaction, in the presence of fused acetamide, acidifying the reaction mixture, and separating the 5,5-diphenyl hydantoin thus produced.

8. Process for the preparation of 5,5-diphenyl hydantoin which comprises heating together in a closed system preventing loss of volatile reactants at temperatures above 90° C. and for a time, at least a few hours, permitting accumulation of appreciable reaction product, benzophenone, a water-soluble inorganic cyanide, and a reagent derived from the system $NH_3$—$CO_2$—Aq capable of regenerating all of these latter components under the conditions of the reaction, in the presence of fused acetamide, acidifying the reaction mixture, and separating the 5,5-diphenyl hydantoin thus produced.

9. Process for preparing 5,5-diphenyl hydantoin which comprises heating together at temperatures above 90° C. for several hours, benzophenone, a water-soluble inorganic cyanide, and a reagent derived from the system $NH_3$—$CO_2$—Aq capable of regenerating all of these latter components under the conditions of the reaction, in the presence of fused acetamide, adding an acidified aqueous solution, and separating the diphenyl hydantoin thus produced.

10. Process for preparing 5,5-diphenyl hydantoin which comprises heating together in a closed system preventing loss of volatile reactants at a temperature about 110° C. for several hours, benzophenone, an alkali cyanide, and ammonium carbonate, in the presence of fused acetamide, adding an acidified aqueous solution, and separating the diphenyl hydantoin thus produced.

HENRY R. HENZE.